US011679684B2

(12) United States Patent
Robb et al.

(10) Patent No.: US 11,679,684 B2
(45) Date of Patent: Jun. 20, 2023

(54) MODULAR BOOST CONVERTER SYSTEM WITH SUPER CAPACITOR

(71) Applicant: HYZON MOTORS INC., Honeoye Falls, NY (US)

(72) Inventors: Gary M. Robb, Honeoye Falls, NY (US); Zhijun Gu, Naperville, IL (US)

(73) Assignee: HYZON MOTORS INC., Honeoye Falls, NY (US)

( * ) Notice: Subject to any disclaimer, the term of this patent is extended or adjusted under 35 U.S.C. 154(b) by 0 days.

(21) Appl. No.: 17/489,917

(22) Filed: Sep. 30, 2021

(65) Prior Publication Data
US 2022/0111741 A1  Apr. 14, 2022

Related U.S. Application Data

(60) Provisional application No. 63/090,794, filed on Oct. 13, 2020.

(51) Int. Cl.
*B60L 1/14* (2006.01)
*B60L 50/40* (2019.01)
*H02J 7/14* (2006.01)
*B60L 50/75* (2019.01)

(52) U.S. Cl.
CPC .......... *B60L 50/40* (2019.02); *B60L 50/75* (2019.02); *H02J 7/1438* (2013.01); *B60L 2210/14* (2013.01)

(58) Field of Classification Search
CPC ...... B60L 50/40; B60L 2210/14; B60L 50/75; H02J 7/1438
See application file for complete search history.

(56) References Cited

U.S. PATENT DOCUMENTS

| 6,166,934 A | 12/2000 | Kajouke et al. |
| 9,358,897 B2 | 6/2016 | Pecnik et al. |
| 2004/0018399 A1* | 1/2004 | Jung ................. H01M 8/04559 429/432 |
| 2006/0152085 A1* | 7/2006 | Flett ...................... H02M 7/003 307/75 |
| 2009/0302153 A1* | 12/2009 | Matasso .................. H02J 1/10 244/99.2 |

(Continued)

OTHER PUBLICATIONS

Written Opinion of the International Searching Authority dated Dec. 28, 2021.

(Continued)

*Primary Examiner* — Jared Fureman
*Assistant Examiner* — Esayas G Yeshaw
(74) *Attorney, Agent, or Firm* — Jacob M. Ward; Ward Law Office LLC

(57) ABSTRACT

A modular boost converter includes a fuel cell, a modular boost converter, a battery, a motor, and a capacitor. The modular boost converter includes a plurality of modules. Each of the plurality of modules include a boost system. Only one converter is necessary to utilize each of the fuel cell and the capacitor. The single converter can have a capacity to convert power greater than the energy of the fuel cell, but the total output power of the converter is less than the total energy provided by the fuel cell and the capacitor combined. The modular boost converter utilizes internal module switching to selectively draw energy from at least one of the fuel cell and the capacitor.

20 Claims, 9 Drawing Sheets

(56) References Cited

U.S. PATENT DOCUMENTS

| | | | | |
|---|---|---|---|---|
| 2010/0090525 A1* | 4/2010 | King | ...................... | B60L 58/20 |
| | | | | 180/65.265 |
| 2011/0084648 A1* | 4/2011 | Cao | ........................ | B60L 53/14 |
| | | | | 320/167 |
| 2012/0104861 A1* | 5/2012 | Kojori | ...................... | H02J 7/00 |
| | | | | 307/82 |
| 2017/0001538 A1* | 1/2017 | Sun | ....................... | B60L 13/006 |
| 2017/0040915 A1 | 2/2017 | Krolak et al. | | |
| 2017/0346262 A1* | 11/2017 | Sekine | ................ | H02M 7/5387 |

OTHER PUBLICATIONS

Gauchia et al. Fuel Cell, Battery and Supercapacitor Hybrid System for Electric Vehicle: Modeling and Control via Energetic Macroscopic Representation, Vehicle Power and Propulsion Conference, 2015. [retrieved on Dec. 3, 2021]. Retrieved from the Internet. <URL: https://hal.archives-ouvertes.fr/hal-01218789/document>. entire document.

* cited by examiner

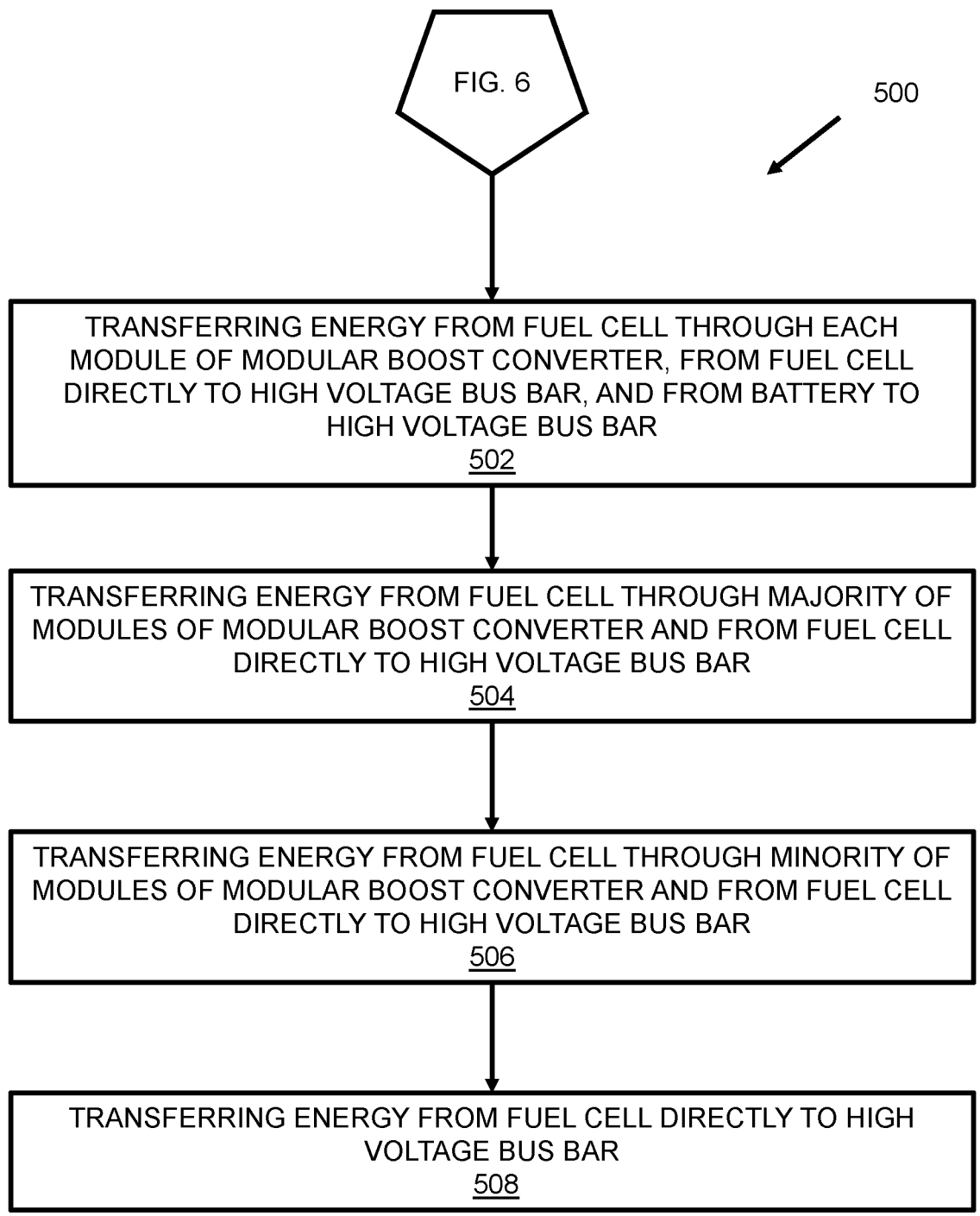

MODULAR BOOST CONVERTER SYSTEM WITH SUPER CAPACITOR

CROSS-REFERENCE TO RELATED APPLICATIONS

This application claims the benefit of U.S. Provisional Application. No. 63/090,794 filed on Oct. 13, 2020. The entire disclosure of the above application is incorporated herein by reference.

FIELD

The present disclosure relates generally to fuel cells, and more particularly, to fuel cells operating in conjunction with a capacitor.

INTRODUCTION

This section provides background information related to the present disclosure which is not necessarily prior art.

Fuel cells have become an important renewable energy option. However, fuel cell technology is still developing, and there are numerous key areas in which fuel cell technology can improve relating to fuel cell efficiency, lifespan, and manufacturing costs. For example, commercial vehicles are becoming electrified to address carbon footprint and total cost of ownership. Commercial vehicles tend to have higher total weight and therefore require very high power for acceleration and deceleration. The nearly instantaneous power required for acceleration or deceleration can be several times (e.g., 5-10 times) that required for maintaining normal highway speeds. As such, power required for acceleration and/or deceleration can be far beyond what can be provided by a fuel cell during acceleration or accumulated by a battery during deceleration, for example.

Various methods for enhancing power management of fuel cell systems are known. For example, batteries with higher rates of charge/discharge can be used. However, these batteries can be substantially more expensive. As a result, this alternative method may not be feasible for manufacturers in certain industries to utilize.

Other methods may incorporate more sources of energy storage, but this strategy can also require additional converters for each source of energy storage. These other methods can therefore be inefficient as additional converters can increase material costs, can increase the weight of the system, and can increase the volume of the system.

Accordingly, there is a continuing need for improved power management of a fuel cell system that is capable of transferring high outputs of power at desired moments. Desirably, the power management aspects of the fuel cell system should provide simpler, lower cost, and more efficient high voltage architecture for fuel cell powered electric vehicles.

SUMMARY

In concordance with the instant disclosure, a modular boost converter that can optimize power management for a fuel cell system, while presenting a simpler, lower cost, and more efficient high voltage architecture for fuel cell powered electric vehicles, has surprisingly been discovered.

The present disclosure provides an assembly of a modular boost converter that includes a fuel cell system, a modular boost converter, a battery (e.g., high voltage battery), a motor, and a capacitor (e.g., a supercapacitor). The modular boost converter can include a plurality of modules. Each of the plurality of modules can include a boost system. The converter can be further configured as a dc/dc converter and each module can operate to provide a DC/DC boost. Advantageously, by utilizing a capacitor, such as a supercapacitor, with the modular boost converter, high rates of power can be quickly transferred at desired moments while discharging or charging the capacitor. In certain embodiments, only one modular boost converter is necessary to utilize each of the fuel cell and the capacitor. The single converter can have a capacity to convert power greater than the energy of the fuel cell, but the total output power of the converter can be less (e.g., at least 10% less) than the total energy provided by the fuel cell and the capacitor. The modular boost converter can utilize internal module switching to selectively and interchangeably draw energy from at least one of the fuel cell and the capacitor. In other words, energy transfer may be interchangeably directed between each of the modules. Advantageously, by requiring only one modular boost converter, which can be utilized by both the fuel cell and the capacitor, the overall cost and complexity of the system can be reduced. Desirably, by requiring only one modular boost converter utilized by both the fuel cell and the capacitor, the overall weight of the system can be minimized and the efficiency of the system can be enhanced.

In certain embodiments, modular boost converters can operate by transferring energy from at least one of the fuel cell and the capacitor. Such operation methods can include a step of transferring energy only from the super capacitor through all of the modules of the modular boost converter. The method can have another step of transferring energy from the super capacitor through a majority of the modules of the modular boost converter. A minority of modules of the modular boost converter can also draw energy from the fuel cell. Then, the method can include a step of transferring energy from the super capacitor through the minority of the modules of the modular boost converter. The majority of modules of the modular boost converter can also draw energy from the fuel cell. Afterwards, the method can include a step of transferring energy from only the fuel cell through each of the modules of the modular boost converter.

In certain embodiments, modular boost converter can be used for charging or restoring energy in at least one of the battery and the capacitor. Ways of restoring energy can include a first step of converting rotational energy of the motor to potential stored energy in each of the capacitor and the battery. It is also possible to include another step of converting the rotational energy of the motor to potential stored energy in the capacitor. Then, another step can include converting the rotational energy of the motor to potential energy of the battery.

In certain embodiments, use of the modular boost converter can include a method for restoring energy in the super capacitor by reversing the direction of energy transfer through each of the modules of the modular boost converter.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

FIG. 9 is a flowchart depicting steps of a fourth method for maintaining a rate of energy transfer using the modular boost converter with capacitor assembly, according to one embodiment of the present technology.

DETAILED DESCRIPTION

Figure 1:
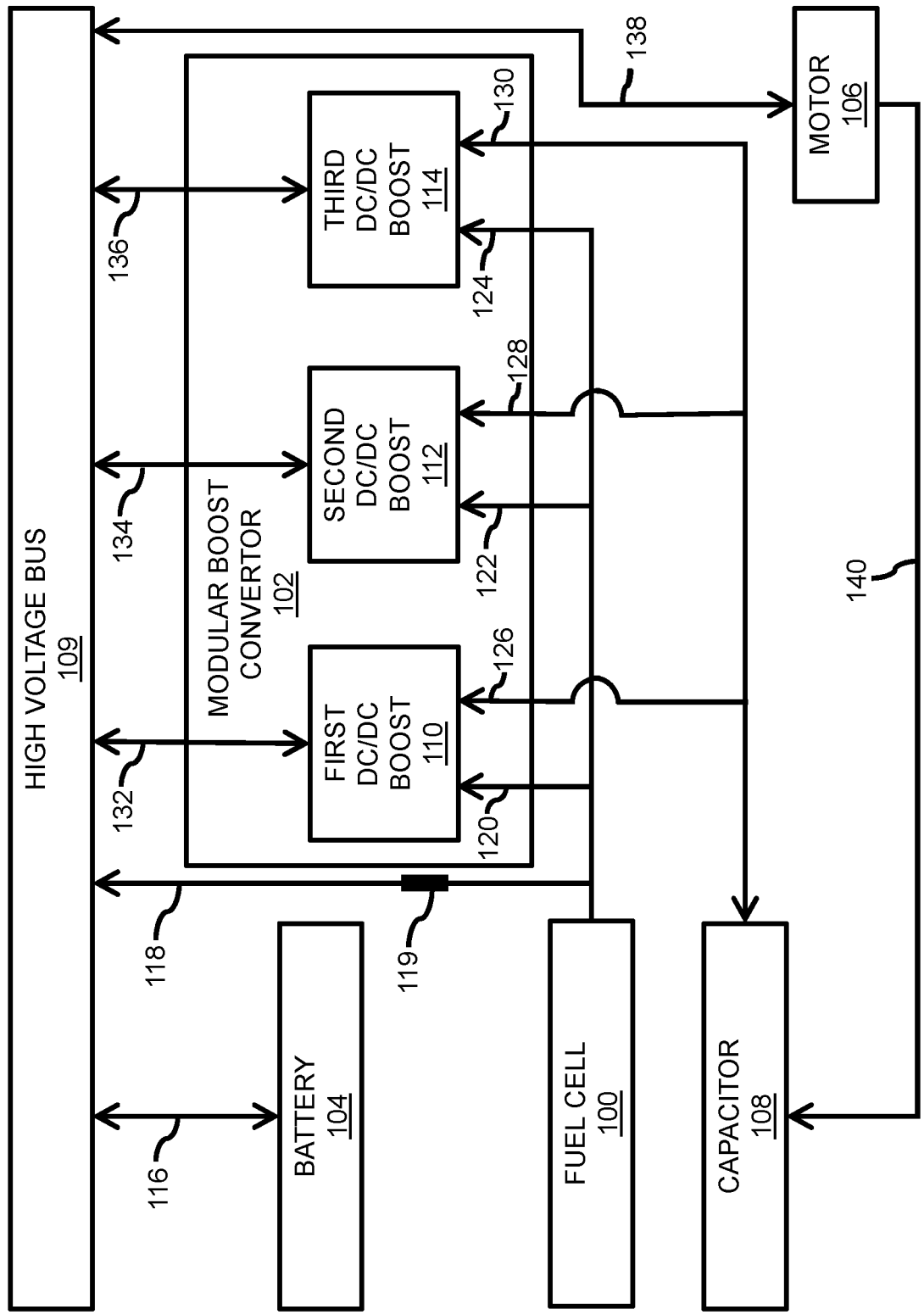
FIG. 1 is a schematic drawing depicting the configuration of an embodiment of a modular boost converter with capacitor assembly in accordance with the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIG. 1, the present technology includes a fuel cell 100, a modular boost converter 102, a battery 104, a motor 106, and a capacitor 108. The motor 106 may be in electrical communication with the fuel cell 100, the capacitor 108, and the battery 104. The modular boost converter 102 may be in electrical communication with each of the fuel cell 100, the capacitor 108, and the motor 106. The modular boost converter 102 may be configured to direct energy transfer of both the fuel cell 100 and the capacitor 108 relative to the motor 106. In certain circumstances, the present technology can also include a high voltage bus bar 109 that electrically couples each of the fuel cell 100, the modular boost converter 102, the battery 104, the motor 106, and the capacitor 108. The battery 104 can include a high voltage battery. The modular boost converter 102 can include one or more modules 110, 112, 114. Each of the modules 110, 112, 114 can include a boost module. The modular boost converter 102 can be further configured as a direct current to direct current (DC/DC) converter. As a non-limiting example, the modules 110, 112, 114 can include a first DC/DC boost module 110, a second DC/DC boost module 112, and a third DC/DC boost module 114, as shown. The modular boost converter 102 can have bi-directional capabilities. The battery 104 and the motor 106 can be configured to have matching or substantially similar voltage ranges. The fuel cell 100 can be capable of voltage boosting with a partial bypass. The capacitor 108 can have a lower maximum voltage than a minimum motor voltage of the motor 106. Advantageously, by utilizing a capacitor 108 with the modular boost converter 102, high rates of power can be quickly provided at desired moments while fully discharging the capacitor 108. Full discharge of the capacitor 108 can make use of all of the available capacity.

The capacitor 108 can include a supercapacitor having a high-capacity capacitor with a capacitance value much higher than other capacitors, but with lower voltage limits. The supercapacitor 108 can bridge the gap between electrolytic capacitors and rechargeable batteries. The supercapacitor 108 can store more energy per unit volume or mass than electrolytic capacitors (e.g., from 10 to 100 times more), can accept and deliver charge much faster than batteries, and can tolerate many more charge and discharge cycles than batteries. Supercapacitors are sometimes referred to as "ultracapacitors." One non-limiting example of a suitable type of supercapacitor or ultracapacitor is commercially available from Skeleton Technologies GmbH, located in Großröhrsdorf, Germany. The supercapacitor 108 can be configured accommodate many rapid charge/discharge cycles, and can be particularly adapted for use in regenerative braking, short-term energy storage, or burst-mode power delivery.

In certain embodiments, with reference to FIGS. 1-5, the present technology can include various ways of electrically coupling each of the components. For instance, the battery 104 can be coupled to the high voltage bus bar 109 through a first connection 116. The fuel cell 100 can be coupled to the high voltage bus bar 109 through a second connection 118. The second connection 118 can be selectively engaged through a switch 119. The fuel cell 100 can be coupled to the first module 110 through a third connection 120. The fuel cell 100 can be coupled to the second module 112 through a fourth connection 122. The fuel cell 100 can be coupled to the third module 114 through a fifth connection 124. The capacitor 108 can be coupled to the first module 110 through a sixth connection 126. The capacitor 108 can be coupled to the second module 112 through a seventh connection 128. The capacitor 108 can be coupled to the third module 114 through an eighth connection 130. The first module 110 can be coupled to the high voltage bus bar 109 through a ninth connection 132. The second module 112 can be coupled to the high voltage bus bar 109 through a tenth connection 134. The third module 114 can be coupled to the high voltage bus bar 109 through an eleventh connection 136. The high voltage bus bar 109 can be coupled to the motor 106 through a twelfth connection 138. The motor 106 can be coupled to the capacitor 108 through a thirteenth connection 140. One skilled in the art can select any suitable means of coupling each component of the present technology, within the scope of the present disclosure.

In certain embodiments, only one modular boost converter 102 is necessary to utilize each of the fuel cell 100 and the capacitor 108. The single modular boost converter 102 can have a capacity to convert power greater than the energy of the fuel cell 100, but the total output power of the converter 102 can be less (e.g., at least 10% less) than the total energy provided by the fuel cell 100 and the capacitor 108 combined. The modular boost converter 102 can utilize internal module switching (e.g., between the first DC/DC boost module 110, the second DC/DC boost module 112, and/or the third DC/DC boost module 114) to selectively draw energy from at least one of the fuel cell 100 and the capacitor 108. Advantageously, by requiring only one converter 102 which can be utilized by both of the fuel cell 100 and the capacitor 108, the overall cost of the system can be reduced.

Figure 6:
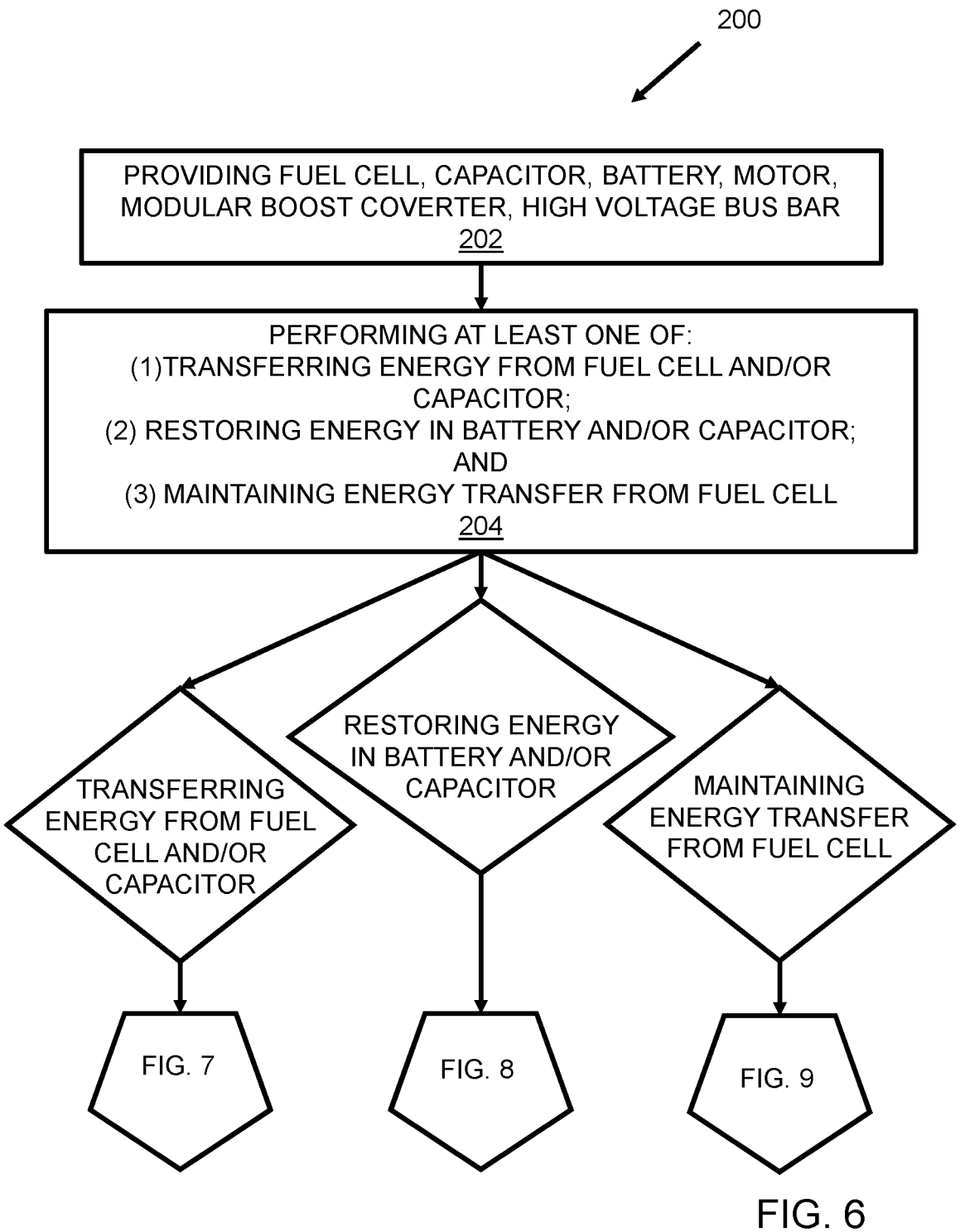
FIG. 6 is a flowchart depicting steps of the first method for transferring energy using the modular boost converter with capacitor assembly, according to one embodiment of the present technology.

As shown in FIG. 6, the present technology can include a first method 200 for transferring energy using the present technology. The first method 200 can include a step 202 of providing a fuel cell 100, a capacitor 108, a battery 104, a motor 106, and a modular boost converter 102. Next the first method 200 can include a step 204 of performing at least one of transferring energy from the fuel cell 100 and/or the capacitor 108 and restoring energy in the battery 104 and/or the capacitor 108.

Figure 2:
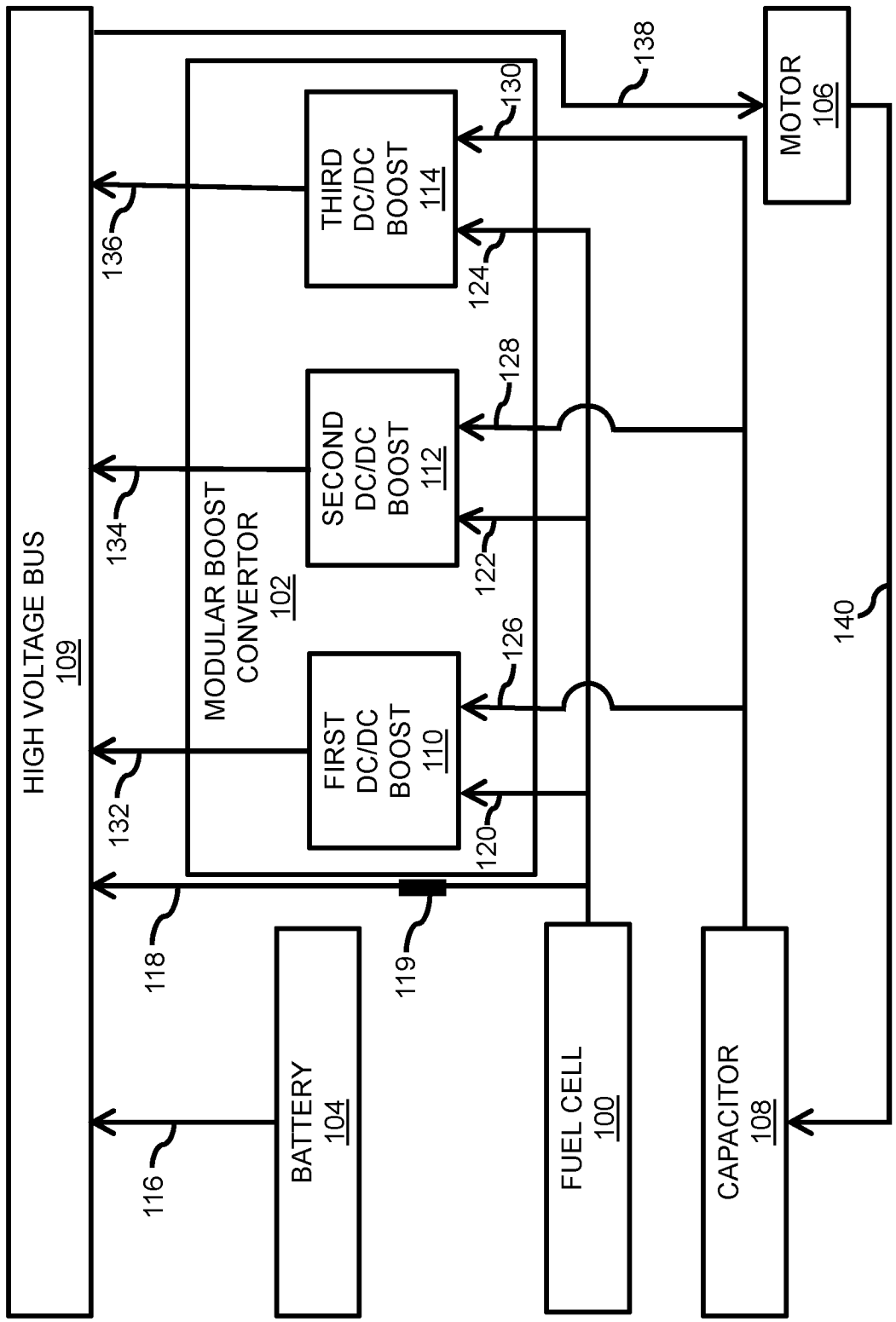
FIG. 2 is a schematic drawing of the modular boost converter with capacitor assembly as shown in FIG. 1, further depicting the operation of the modular boost converter with capacitor assembly according to a second method.
Figure 7:
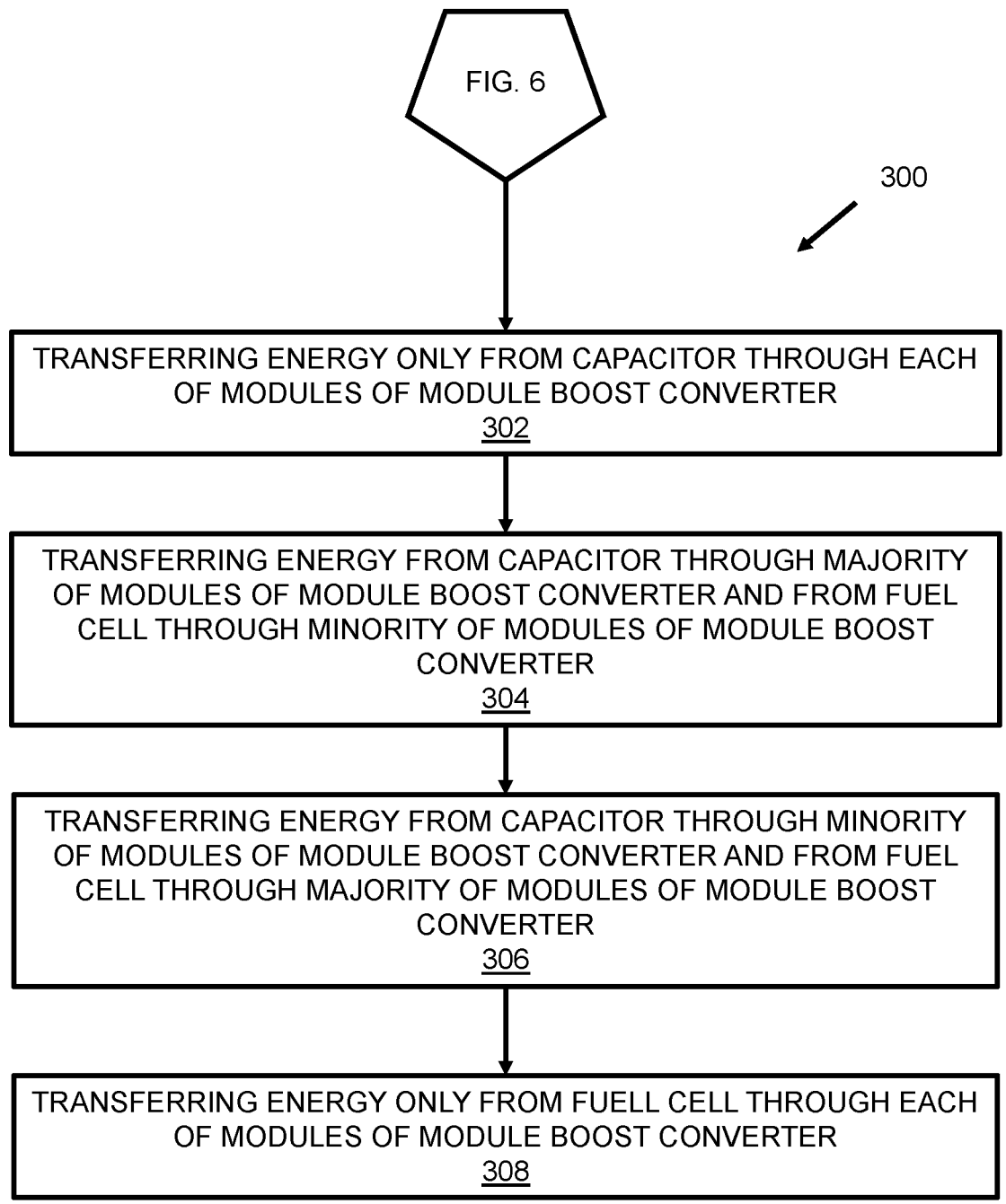
FIG. 7 is a flowchart depicting steps of a second method for transferring energy from the fuel cell and/or the capacitor, according to one embodiment of the present technology.

As shown in FIGS. 2, 6, and 7, in a particular embodiment, the modular boost converter 102 with capacitor 108 can include a second method 300 further defining the first method 200 for transferring energy from at least one of the fuel cell 100 and the capacitor 108. The second method 300 can include a step 302 of transferring energy only from the capacitor 108 through each of the modules 110, 112, 114 of the modular boost converter 102. The second method 300 can have a step 304 of transferring energy from the capacitor 108 through a portion of the modules 110, 112, 114, which can include half of the modules 110, 112, 114 (where an even number of modules exist) up to a majority of the modules 110, 112, 114 of the modular boost converter 102. For instance, as shown in FIG. 2, energy can be transferred from the capacitor 108 to the second module 112 through the seventh connection 128 and the third module 114 through the eighth connection 130; e.g., using two of the three modules 110, 112, 114. The remaining portion of the modules 110 of the modular boost converter 102 can also draw energy from the fuel cell 100. The remaining portion can be half or a minority of the modules. For instance, energy can also be transferred from the fuel cell 100 to the first module 110 through the third connection 120; e.g., using one of the three modules 110, 112, 114. Then, the second method 300 can include a step 306 of transferring energy from the capacitor 108 through a portion of the modules 114 of the modular boost converter 102, where the portion can be half or a minority of the modules. For instance, energy can be transferred from the capacitor 108 to the third module 114 through the eighth connection 130; e.g., using one of the three modules 110, 112, 114. The remaining portion of the modules 110, 112 of the modular boost converter 102 can also draw energy from the fuel cell 100, where the remaining portion can be half or a majority of the modules. For instance, energy can be transferred from the fuel cell 100 to the first module 110 through the third connection 120 and to the second module 112 through the fourth connection 122; e.g., using two of the three modules 110, 112, 114. Afterwards, the second method 300 can include a step 308 of transferring energy from the fuel cell 100 through each of the modules 110, 112, 114 of the modular boost converter 102. Advantageously, this second method 300 can be used in certain circumstances where high energy output is required, such as during an acceleration phase of an electric vehicle, as a non-limiting example.

Figure 4:
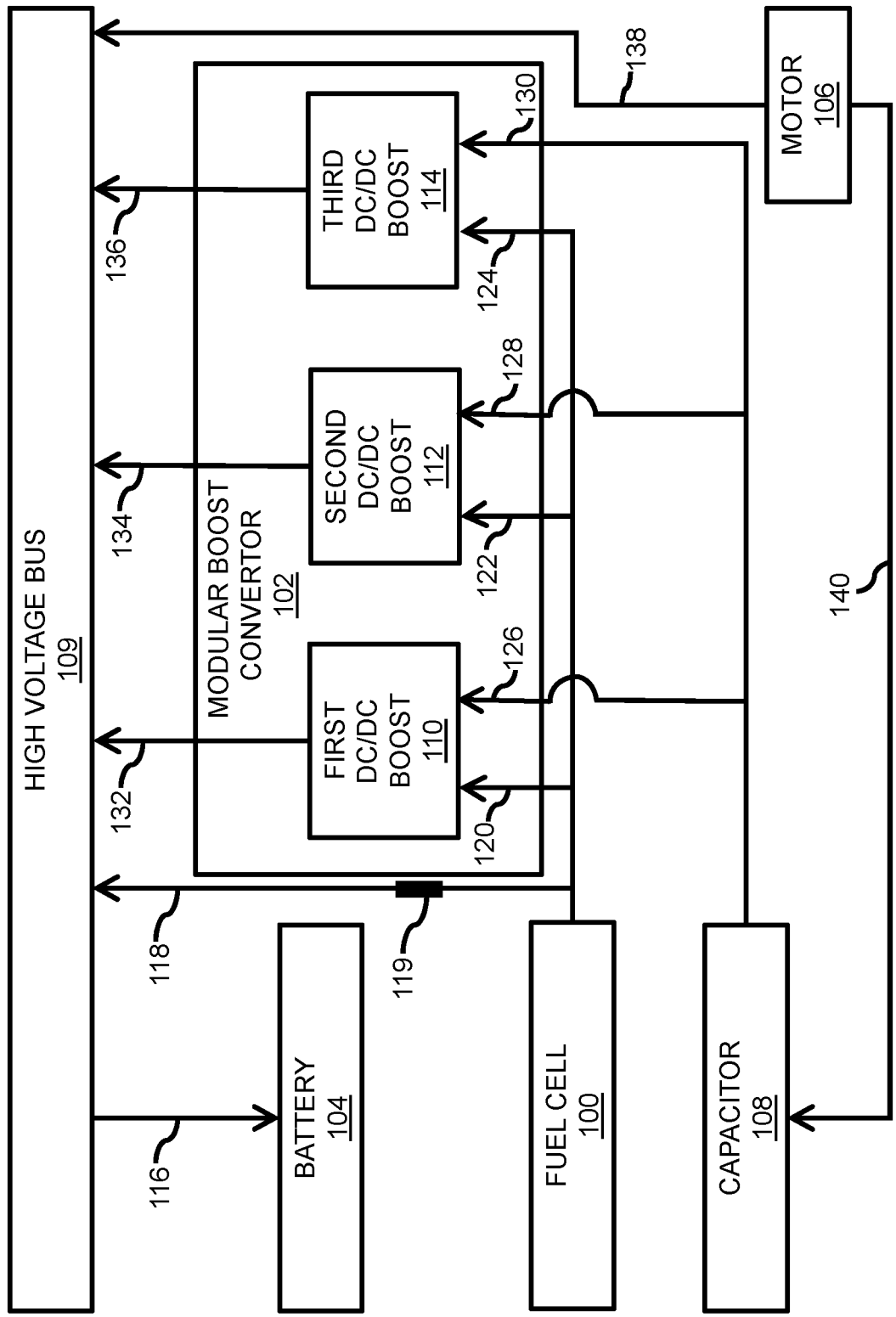
FIG. 4 is a schematic drawing of the modular boost converter with capacitor assembly as shown in FIG. 1, further depicting the operation of the modular boost converter with capacitor assembly according to a third method.
Figure 8:
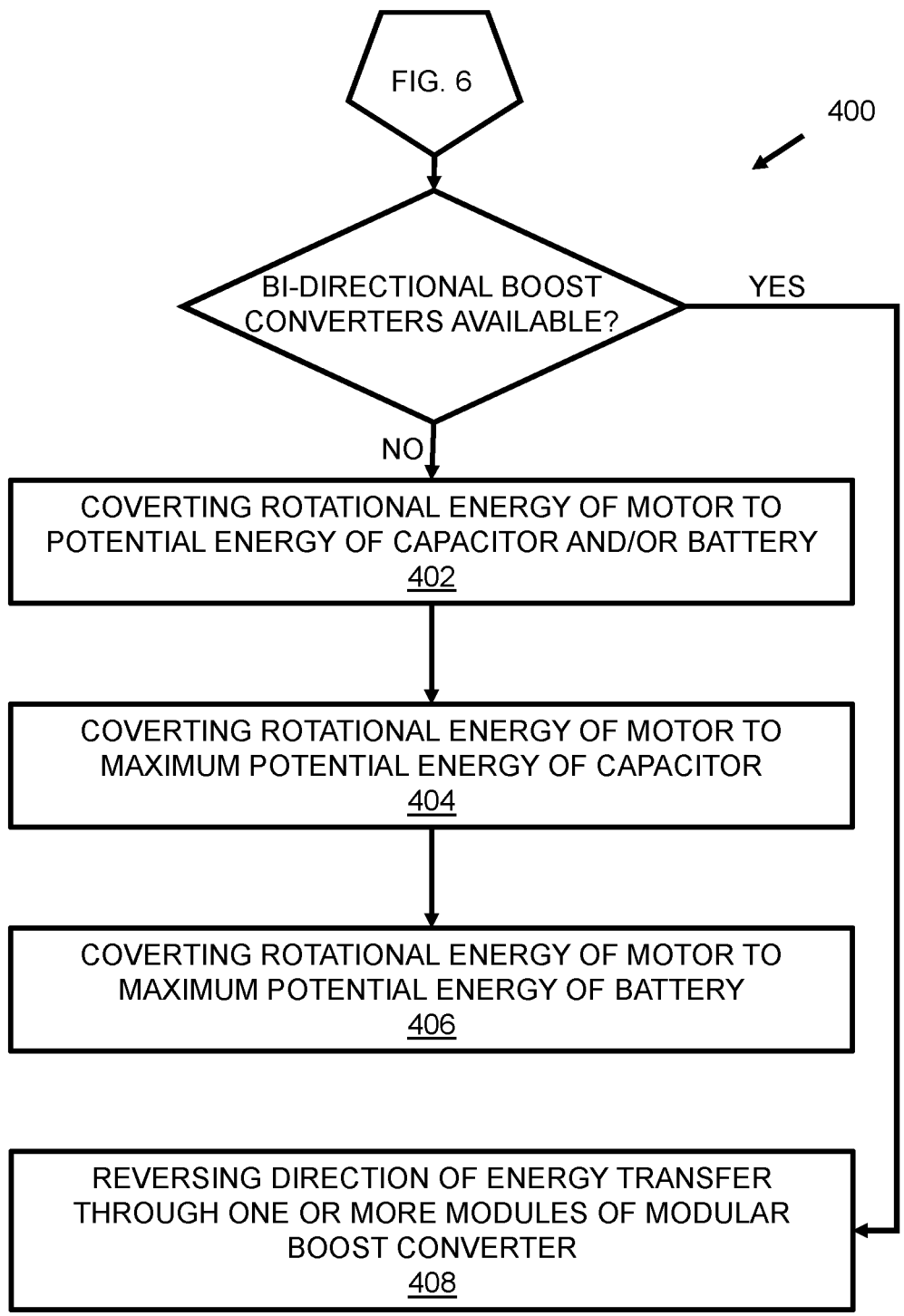
FIG. 8 is a flowchart depicting steps of a third method for restoring energy in the battery and/or the capacitor, according to one embodiment of the present technology.

As shown in FIGS. 4, 6, and 8, in certain embodiments, the modular boost converter 102 with the capacitor 108 can include a third method 400 further defining the first method 200 for restoring energy in at least one of the battery 104 and the capacitor 108. The third method 400 can include a first step 402 of converting the rotational energy of the motor 106 to potential stored energy in each of the capacitor 108 through the thirteenth connection 140 and the battery 104 through each of the first connection 116 and the twelfth connection 138. The third method 400 can also include a second step 404 of converting the rotational energy of the motor 106 to potential stored energy in the capacitor 108 through the thirteenth connection 140. Then, the third method 400 can include another step 406 of converting the rotational energy of the motor 106 to potential energy of the battery 104 through each of the first connection 116 and the twelfth connection 138.

Figure 5:
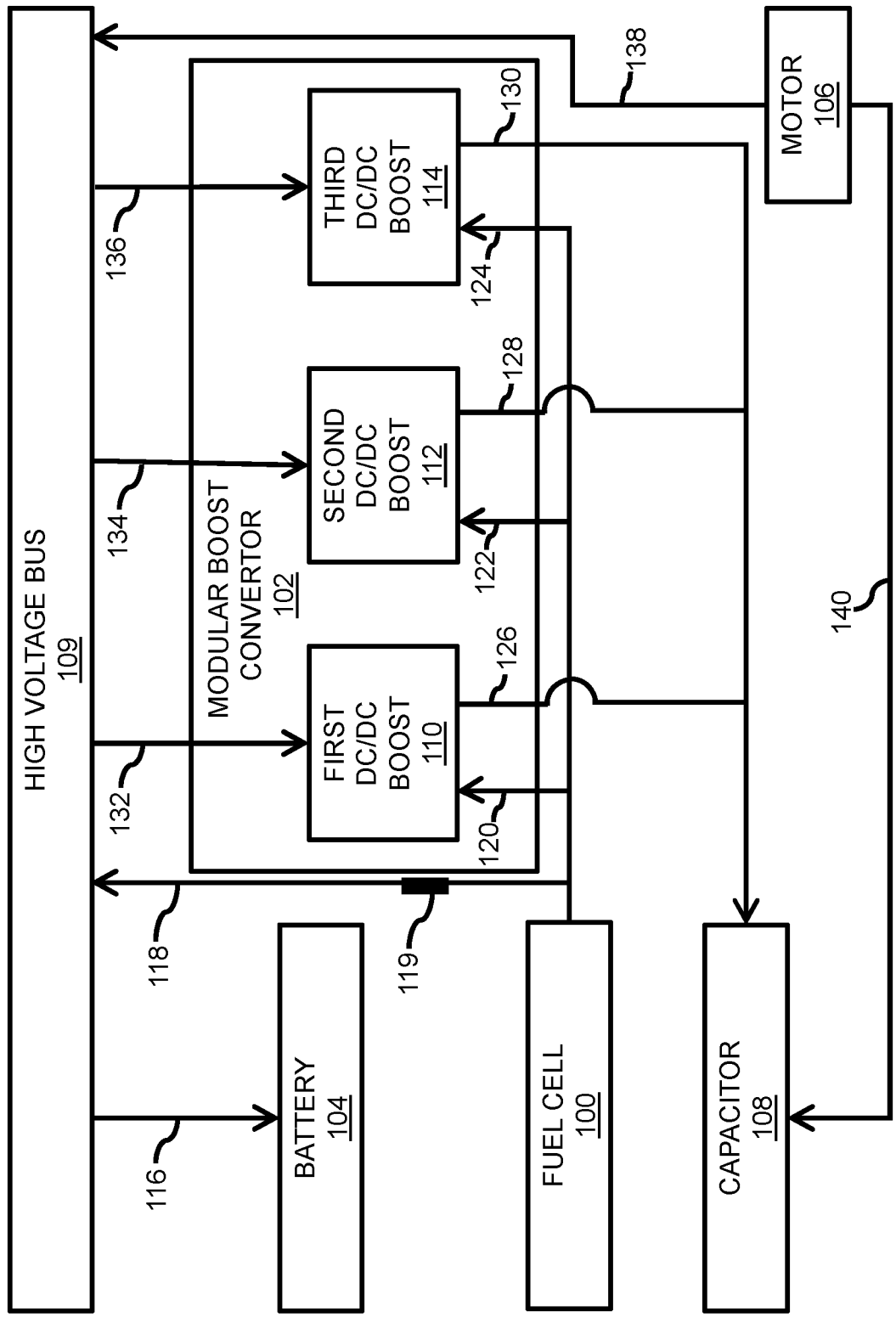
FIG. 5 is a schematic drawing of the modular boost converter with capacitor assembly as shown in FIG. 1, further depicting the operation of the modular boost converter with capacitor assembly according to an alternative embodiment of the third method.

As shown in FIGS. 5, 6, and 8, in an alternative embodiment, the third method 400 can include another step 408 for restoring energy in the capacitor 108 which can include reversing the direction of energy transfer through one or more of the modules 110, 112, 114 of the modular boost converter 102. For instance, the direction of energy transfer can be reversed in one or more of the sixth connection 126, the seventh connection 128, the eighth connection 130, the ninth connection 132, the tenth connection 134, and the eleventh connection 136. Advantageously, this third method 400 can be used in certain circumstances where low energy output is required, such as during a deceleration phase of an electric vehicle, as a non-limiting example.

Figure 3:
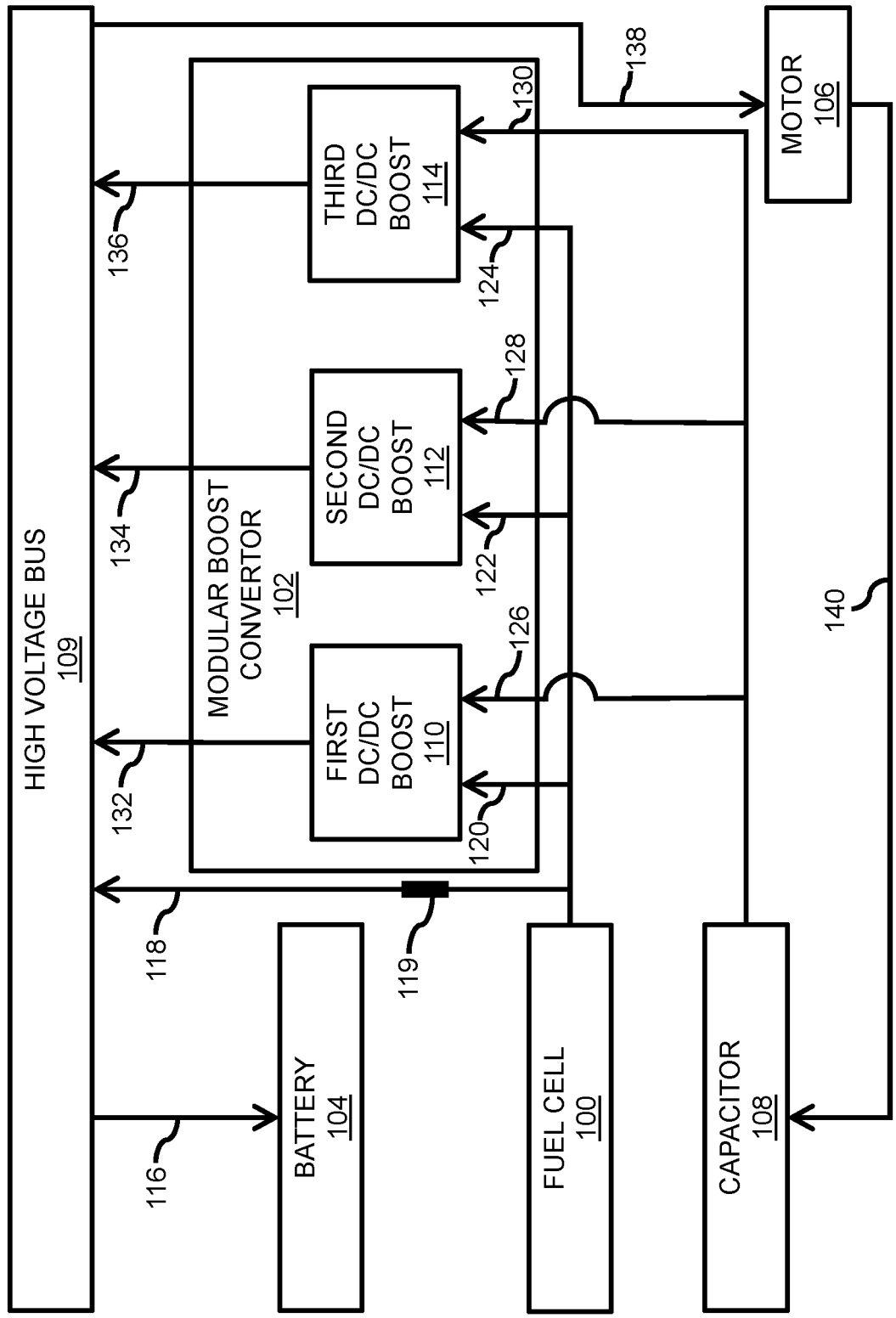
FIG. 3 is a schematic drawing of the modular boost converter with capacitor assembly as shown in FIG. 1, further depicting the operation of the modular boost converter with capacitor assembly according to a fourth method.

As shown in FIGS. 3, 6, and 9, in a particular embodiment, the modular boost converter 102 with the capacitor 108 can include a fourth method 500 further defining the first method 200 for substantially maintaining a rate of energy transfer. The fourth method 500 can include a step 502 of transferring energy from the fuel cell 100 through each of the modules 110, 112, 114 of the modular boost converter 102 and directly to the high voltage bus bar 109 through the second connection 118, where a significant demand for energy transfer is required. Energy can also be transferred from the battery 104 to the high voltage bus bar 109 through the first connection 116 throughout the step 502 of the fourth method 500. Energy can also be transferred from the fuel cell 100 to the high voltage bus bar 109 through the second connection 118 throughout the step 502 of the fourth method 500. The fourth method 500 can include another step 504 of transferring energy from the fuel cell 100 through a portion of the modules 110, 112 of the modular boost converter 102, where the portion can be half or a majority of the modules, in circumstances where a moderate demand for energy transfer is required. For instance, energy can be transferred from the fuel cell 100 to each of the first module 110 through the third connection 120 and the second module 112 through the fourth connection 122; e.g., using two of the three modules 110, 112, 114. Energy can also be transferred from the fuel cell 100 to the high voltage bus bar 109 through the second connection 118 throughout the step 504 of the fourth method 500. The fourth method 500 can also include a step 506 of transferring energy from the fuel cell 100 to a remaining portion of the modules 110 of the modular boost converter 102, where the remaining portion can be half or a minority of the modules, in circumstances where a low demand for energy transfer is required. For instance, energy can be transferred from the fuel cell 100 to the first module 110 through the third connection 120; e.g., using one of the three modules 110, 112, 114. Energy can also be transferred from the fuel cell 100 to the high voltage bus bar 109 through the second connection 118 throughout the step 506 of the fourth method 500. The fourth method 500 can further include a step 508 of transferring energy from the fuel cell 100 to the high voltage bus bar 109 through the second connection 118 and bypassing the modular boost converter 102, where a minimal demand for energy transfer is required, such as where an electric vehicle is idling, as a non-limiting example. The direction of energy transfer can also be reversed between the battery 104 and the high voltage bus bar 109 through the first connection 116 during this last step 508. Advantageously, the fourth method 500 for substantially maintaining a rate of energy transfer can be used in certain circumstances where energy output is required, but high energy is output is unnecessary, such as during idling and normal operating speeds of electric vehicles, as a non-limiting example.

Advantageously, the modular boost converter 102 with the capacitor 108 is capable of providing high outputs and transfers of power at desired moments. Desirably, the high output modular boost converter 102 with the capacitor 108 provides a simpler, lower cost, and more efficient high voltage architecture for fuel cell powered electric vehicles.

While certain representative embodiments and details have been shown for purposes of illustrating the invention, it will be apparent to those skilled in the art that various changes can be made without departing from the scope of the disclosure, which is further described in the following appended claims.

What is claimed is:

1. A modular boost converter and capacitor assembly, comprising:
   a fuel cell;
   a capacitor;
   a battery;
   a motor that is in electrical communication with each of the fuel cell, the capacitor, and the battery; and
   a single modular boost converter that is selectively in electrical communication with each of the fuel cell, the capacitor, and the motor, wherein the modular boost converter is configured to direct energy transfer of both the fuel cell and the capacitor relative to the motor.

2. The modular boost converter and capacitor assembly of claim 1, wherein the modular boost converter includes a plurality of modules configured to direct energy transfer.

3. The modular boost converter and capacitor assembly of claim 2, wherein energy transfer is directed to each of the modules.

4. The modular boost converter and capacitor assembly of claim 2, wherein energy transfer is interchangeably directed between each of the modules.

5. The modular boost converter and capacitor assembly of claim 2, wherein energy transfer is directed to a minority of the modules.

6. The modular boost converter and capacitor assembly of claim 2, wherein each module includes a direct current to direct current converter.

7. The modular boost converter and capacitor assembly of claim 2, wherein the plurality of modules includes three modules.

8. The modular boost converter and capacitor assembly of claim 1, wherein the modular boost converter is configured for bi-directional energy transfer.

9. The modular boost converter and capacitor assembly of claim 1, wherein the battery includes a voltage capacity that is substantially similar to a voltage range of the motor.

10. The modular boost converter and capacitor assembly of claim 1, wherein the capacitor includes a maximum voltage capacity that is lower than a minimum voltage capacity of the motor.

11. The modular boost converter and capacitor assembly of claim 1, wherein the motor includes a voltage range that is substantially similar to a voltage range of the battery.

12. A method for transferring energy using a modular boost converter and a capacitor assembly, the method comprising steps of:
   providing a single modular boost converter having a fuel cell, a capacitor, a battery, a motor that is in electrical communication with each of the fuel cell, the capacitor, and the battery, and a modular boost converter that is selectively in electrical communication with each of the fuel cell, the capacitor, and the motor, wherein the modular boost converter is configured to direct energy transfer of both the fuel cell and the capacitor relative to the motor; and
   performing at least one of:
      transferring energy from at least one of the fuel cell and the capacitor; and
      restoring energy in at least one of the battery and the capacitor.

13. The method of claim 12, further comprising a step of bypassing the energy transfer through the modular boost converter.

14. The method of claim 12, wherein the energy is transferred only from the capacitor through a plurality of modules within the modular boost converter.

15. The method of claim 12, wherein the energy is transferred from the capacitor through a portion of a plurality of modules of the modular boost converter while transferring energy through a remaining portion of the plurality of modules of the modular boost converter from the fuel cell, wherein the portion of modules is one of equal to and greater than the remaining portion of the modules.

16. The method of claim 12, wherein the energy is transferred from the capacitor through a portion of a plurality of modules of the modular boost converter while transferring energy through a remaining portion of the modules of the modular boost converter from the fuel cell, wherein the portion of modules is one of equal to and less than the remaining portion of the modules.

17. The method of claim 12, wherein the energy is transferred only from the fuel cell through the modular boost converter.

18. The method of claim 12, wherein the energy is converted to rotational energy from the motor to potential stored energy in each of the capacitor and the battery.

19. The method of claim 12, wherein the energy is converted to rotational energy from the motor to potential stored energy in the capacitor.

20. The method of claim 12, wherein the energy is converted to rotational energy from the motor to potential energy of the battery.

* * * * *